(12) United States Patent
Bontemps et al.

(10) Patent No.: US 8,006,841 B2
(45) Date of Patent: Aug. 30, 2011

(54) STACKABLE NUCLEAR FUEL STORAGE ELEMENT AND STORAGE MODULE FORMED BY A STACK OF SUCH ELEMENTS

(75) Inventors: Virgine Bontemps, Toulon (FR); Jean-Claude Argoud, Montbonnot (FR)

(73) Assignee: Commissariat a l'Energie Atomique, Paris (FR)

(*) Notice: Subject to any disclaimer, the term of this patent is extended or adjusted under 35 U.S.C. 154(b) by 492 days.

(21) Appl. No.: 12/162,112

(22) PCT Filed: Jan. 17, 2007

(86) PCT No.: PCT/EP2007/050438
§ 371 (c)(1),
(2), (4) Date: Dec. 1, 2008

(87) PCT Pub. No.: WO2007/085555
PCT Pub. Date: Aug. 2, 2007

(65) Prior Publication Data
US 2009/0178944 A1 Jul. 16, 2009

(30) Foreign Application Priority Data
Jan. 26, 2006 (FR) ...................... 06 50281

(51) Int. Cl.
*B65D 85/20* (2006.01)
*G21F 5/06* (2006.01)
(52) U.S. Cl. ............. 206/443; 376/272; 250/507.1; 588/16

(58) Field of Classification Search .......... 206/443, 206/446, 524.1, 524.4; 220/23.87, 23.88, 220/23.89; 376/272, 273; 250/506.1, 507.1; 588/1, 16
See application file for complete search history.

(56) References Cited

U.S. PATENT DOCUMENTS

| | | | |
|---|---|---|---|
| 4,780,269 A | | 10/1988 | Fischer et al. |
| 5,098,645 A | * | 3/1992 | Forsberg ............ 376/272 |
| 6,064,710 A | * | 5/2000 | Singh ............... 376/272 |
| 6,519,307 B1 | * | 2/2003 | Singh et al. ......... 376/272 |
| 7,330,526 B2 | * | 2/2008 | Singh ............... 376/272 |

FOREIGN PATENT DOCUMENTS

| | | |
|---|---|---|
| DE | 36 16 359 A1 | 11/1990 |
| DE | 39-16-359 A1 | 11/1990 |
| FR | 2 449 952 A | 9/1980 |
| FR | 2 498 367 A | 7/1982 |
| FR | 2 803 426 A | 7/2001 |

OTHER PUBLICATIONS

French Search Report.
PCT Search Report.

* cited by examiner

*Primary Examiner* — Jacob K Ackun, Jr.
(74) *Attorney, Agent, or Firm* — Pearne & Gordon LLP

(57) ABSTRACT

A storage element for the storage of cases (16) full of nuclear fuel in the horizontal position, said element comprising ventilation means (19, 32) arranged on the sides of the element, so that storage stacks according to this invention can be created. The storage elements may have a cross-section in the shape of regular hexagon to optimise the storage density.

20 Claims, 3 Drawing Sheets

STACKABLE NUCLEAR FUEL STORAGE ELEMENT AND STORAGE MODULE FORMED BY A STACK OF SUCH ELEMENTS

TECHNICAL FIELD AND PRIOR ART

This invention relates to interim dry storage, for example for between 50 and 100 years, of nuclear fuel in the horizontal position, and particularly irradiated nuclear fuel waiting for permanent geological storage or reprocessing.

As part of the management of irradiated fuels, after they have been used in a reactor, they are cooled in a pool in a building called the fuel building that is usually adjacent to the reactor building.

At the end of this cooling step, nuclear fuel assemblies must then be evacuated to so-called "permanent or interim" storage sites that are safe, and particularly include sealed metallic containments protected by concrete storage modules.

Within this context, it is then envisaged to condition the irradiated fuels in closed sealed cases, forming the first confinement barrier. Each case is then placed in a dry storage device that protects it and forms the second confinement barrier.

There are two methods of storage:
- the first storage method is storage in the vertical position with the cases arranged in pits. This storage method results in a large space saving, however its construction is very expensive and very complicated to implement. The pits have to be excavated and foundations have to be poured. The legislation also specifies that it must be possible to recover the nuclear fuel at any time. If a case breaks, recovery of fuel from the bottom of the pit becomes very difficult,
- the second storage method is horizontal storage in which concrete housings with accesses through their two ends can be designed.

Document U.S. Pat. No. 4,780,269 discloses a module for the horizontal storage of nuclear fuel assembly. Each module comprises one housing for an assembly, that is placed in the housing through one front end of it. Each module only contains a single assembly. These modules are designed to be placed one in contact with the next, in a horizontal plane, to limit lateral radiation emissions, however they are very large and their cost price is high.

This storage module also comprises ventilation means for evacuation of hot air. These ventilation means comprise fresh air inlet ports formed in the front end of the module below the housing of the assembly and hot air evacuation ducts on the roof of the module. Cooling takes place by natural convection.

These storage devices are very large, and storage of several assemblies requires a large floor area.

Document FR 2 498 367 discloses a device for storage of radioactive materials comprising storage cells in which adjacent vertical and horizontal storage compartments are provided to contain radioactive material storage receptacles.

Receptacles are cooled by an airflow inside the compartments.

However, the receptacles are not isolated from each other. Thus, if one receptacle breaks, the entire cell is contaminated. Furthermore, these cells are not modular and require complicated construction.

Consequently, one of the purposes of this invention is to provide a safe storage device in which nuclear fuel can be recovered at any time during the storage period regardless of its condition.

Another purpose of this invention is to provide a compact storage device with a large storage capacity.

DESCRIPTION OF THE INVENTION

The above mentioned purposes are achieved by the use of a horizontal storage device comprising housings for the cases provided with ventilation means, for example by natural convection, formed of ports for air intake and exhaust, these holes being formed in the longitudinal ends of the housing.

In other words, instead of the hot air being evacuated on the top of the storage element as is done in the state of the art, it is done on a loading and/or unloading and/or manipulation side that remains accessible throughout the storage period. Thus, devices can be stacked and placed adjacent to each other to form storage blocks called modules. Thus, a large number of assemblies can be stored on a small area.

The device according to the invention is also modular, thus a storage unit can be constructed with a storage capacity adapted to needs, and if necessary this capacity can be increased simply by adding more elements according to the invention. Thus, financial investments can be adapted as a function of the storage need, without anticipating future needs.

Advantageously, cooling is provided by natural convection of air, which does not require any additional device causing convection. This then reduces the operating cost.

Elements or cells can contain several cases. These elements may have a hexagonal cross-section or they may be formed by a portion of hexagon. Their stackability means that a storage unit can be made on several levels called storage modules, for which the dimensions are optimised.

In one example embodiment, a cell comprises two sealed barriers that are permanently monitored.

The life of the storage element according to the invention is about 100 years.

The loading device according to the invention can also be used to load or unload fuel through a front or back face. Thus, the fuel can be taken out regardless of the condition of the case.

Furthermore, biological shielding may be placed around the periphery of the module and on its upper part. It is composed of concrete slabs, the thickness of which can be optimised as a function of the required dose rate on its outside faces or as a function of the required mechanical strength.

Furthermore, the stack of elements according to the invention reduces emissions due to the superposition of thicknesses of concrete forming the cells.

Consequently, the subject-matter of the invention is mainly an element for the storage of nuclear fuel comprising at least one housing with a longitudinal axis intended to be horizontal to hold a case full of nuclear fuel, comprising first and second longitudinal ends closed by removable plugs, said first and second ends closed by the plugs forming first and second faces of the element, at least one among the first and second ends being used for passage of the case, ventilation means comprising a channel along the housing, at least one port in the first face opening up in said channel and at least one port in the second face opening up in said channel.

In one preferred embodiment, the cross-section of the storage element is formed by at least one portion of a regular hexagon.

This may be an element with a cross-section formed by a regular hexagon, for example comprising seven housings.

It may also be an element with a cross-section formed by a regular trapezium obtained by cutting a regular hexagon with a straight line passing through two opposite corners of said hexagon. This element may be provided with two housings.

The element may also have a cross-section formed by a rectangular trapezium obtained by cutting a regular hexagon with a straight line passing through two opposite corners of said hexagon and by a mid-perpendicular of one side of said hexagon, the straight line and the mid-perpendicular being perpendicular to each other. It can then comprise one housing.

Advantageously, the housing is delimited by a first tube in direct contact with at least one case, the cooling channel surrounding said first tube.

The element may also comprise a second tube delimiting the cooling channel with the first tube, the second tube being surrounded by concrete.

The first tube may then for example be held suspended in the second tube by means of end plates fixed to the longitudinal ends of the first and second tubes, in which ventilation ports are formed.

Each of the two housing plugs is advantageously fixed on an end plate, for example by welding or by screwing.

Metal gaskets and a gasket made of a synthetic material can also be provided between the plugs and the end plates.

For example, the first tube may be made of stainless steel and the second tube of cast iron.

The element according to this invention advantageously comprises means of controlling the seal of the case and the housing including means of injecting helium and detecting helium and/or control means provided with sensors to measure the pressure in the housing.

A subject-matter of the invention is also a module for horizontal storage of nuclear fuel in cases, comprising a stack of elements according to this invention.

The module advantageously only contains elements with a cross-section obtained from a single regular hexagon so as to form a compact stack in the shape of right-angled parallelepiped.

The module is advantageously surrounded by a concrete screed on a lower face, an upper face and on the lateral faces, the longitudinal faces of the housing not being covered so as to leave them accessible for inspections of storage conditions.

BRIEF DESCRIPTION OF THE DRAWINGS

This invention will be better understood after reading the following description and the appended drawings in which.

DETAILED PRESENTATION OF PARTICULAR EMBODIMENTS

Figure 1A:
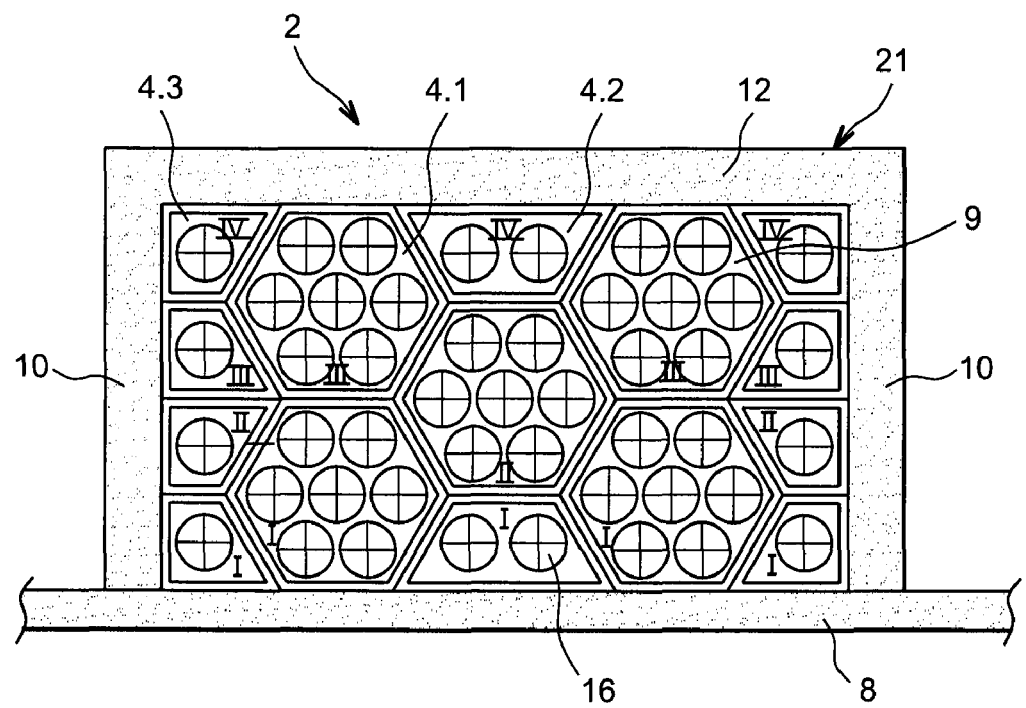
FIG. 1A is a front view of an example construction of a storage module according to this invention.
Figure 1B:
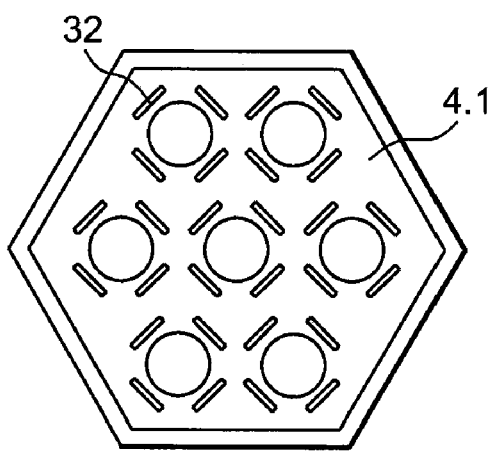
FIG. 1B is a front view of a storage element alone according to the invention.

FIGS. 1A and 1B show a front view of a storage module 2 according to this invention comprising a plurality of storage elements 4.1, 4.2, 4.3 stacked and adjacent to each other.

In the example shown, the module 2 comprises storage elements 4.1, 4.2, 4.3 with a complementary shape so as to optimise the space used, and be able to advantageously construct a right-angled parallelepiped.

We will start by describing a storage element 4.1.

The cross-section of element 4.1 is formed by a regular hexagon and comprises cylindrical housings 14 (not visible in FIGS. 1A and 1B) accessible through a lateral face 9 of the element. Each housing will contain at least one case 16 containing irradiated nuclear fuel. The cases 16 are formed by tubes closed at their longitudinal ends and sealed and containing nuclear fuel, particularly irradiated nuclear fuel.

In the example shown, the element comprises seven housings distributed in three levels, a first level with two housings, a second level with three housings and a third level with two housings, the three levels being parallel to each other and to one side of the hexagon.

It might be possible to have more or less housings 14 depending on the size of the element.

The outside contour of the element 4.2 is obtained by taking one of the portions of the regular hexagon delimited by a straight line A passing through two opposite apexes of the hexagon. This cross-section is then in the shape of a regular trapezium.

In the example shown, this element 4.2 comprises two housings 14.

The outside contour of the element 4.3 is obtained by taking one of the portions of the regular hexagon delimited by a straight line A passing through two opposite apexes of the hexagon and through a mid-perpendicular B on one side of the hexagon, the straight line A and the mid-perpendicular B being perpendicular. This cross-section is then in the shape of a rectangular trapezium.

Advantageously, the elements 4.2 and 4.3 are obtained from the same outside contour as element 4.1. Thus, elements 4.1, 4.2, 4.3 have a complementary shape, facilitating stacking and making the module more compact.

We will now describe the stack forming the module 2, from the left towards the right in FIG. 1.

A first row I is composed of one element 4.3, then one element 4.1, and element 4.2, one element 4.1 and finally one element 4.2. Elements 4.1, 4.2, 4.3 are in plane bearing on one of their sides.

The position of elements 4.1, 4.2 and 4.3 on this first row I is considered to be the upright position. The position of elements for the other rows will be given relative to their position in the first row I.

The second row II comprises one inverted element 4.3, one element 4.1 and one inverted element 4.3.

The third row III comprises one element 4.3, one element 4.1, one element 4.1 and one element 4.3.

The fourth row IV comprises one inverted element 4.3, one inverted element 4.2 and one inverted element 4.3.

This arrangement forms a rectangular parallelepiped.

This parallelepiped is arranged on a concrete screed 8. Lateral screeds 10 and a top screed 12 are also provided to improve confinement of radiation. The lateral screeds 10 and the top screed 12 are placed after construction of the module.

No additional coating is provided at the longitudinal ends of the elements, to enable access to the cases 16 and inspection systems that will be described later.

This stacking configuration has the advantage of being self-supporting, which avoids the need to seal the different elements to each other during their placement.

The module shown in FIG. 1 uses all types of storage elements 4.1, 4.2, 4.3 according to the invention. But it would be possible to use only one type of storage element according to this invention.

Figure 4:
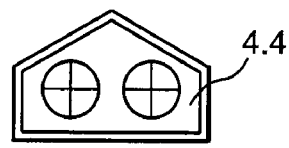
FIG. 4 is a front view of another example elements according to this invention.

One element 4.4 like that shown in FIG. 4 could also be provided to replace two elements 4.3 arranged at the sides of the module. In this case, elements will be provided to maintain the element 4.4 in the vertical position on the outside of the stack.

The scope of this invention includes a longer and higher module than that described above. This invention also includes a different shaped module.

When it is required to increase the storage capacity, all that is necessary is to add elements and to stack them as described above.

Thus, a storage module could be constructed corresponding to needs at a given moment, and elements could be added to increase this capacity without increasing the costs compared with construction in a single step.

Advantageously, separate storage modules are built. Thus, it is possible to make a new module to increase the storage capacity instead of increasing the size of an existing module.

Furthermore, this invention simplifies dismantling of the storage unit, because all that is necessary is to destroy the screeds 10 and 12, and to remove the elements 4.1, 4.2, 4.3 one by one.

This invention is not limited to elements with a hexagonal or portion of hexagon sections, but includes any storage element with a shape that enables compact stacking, for example a rectangular, square or triangular section or even a circular section.

We will now describe the reception housings 14 for the cases 16.

Figure 2:
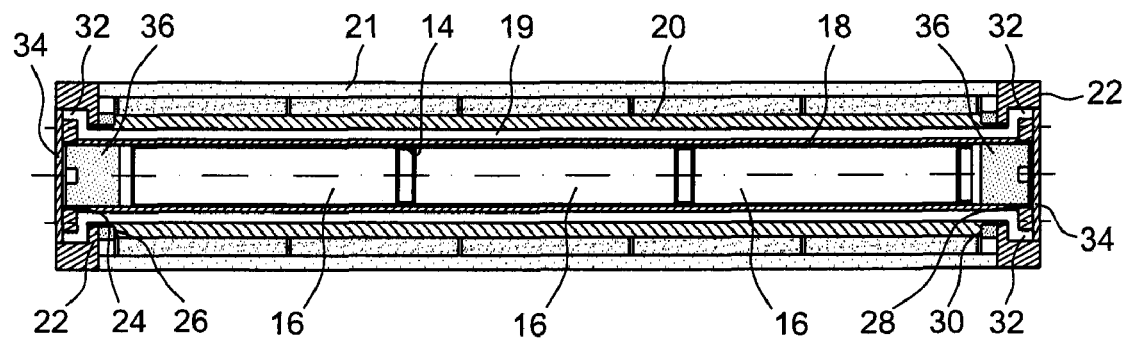
FIG. 2 is a longitudinal sectional view of a part of a storage element according to this invention.

FIG. 2 shows a housing 14 comprising a first tube 18 that will contain at least one case 16 centred in the first tube 18. In the example shown, it contains three cases 16 in line.

The tube 18 is arranged in a second tube 20 approximately coaxial with it, so as to form an annular channel 19 between the first tube 18 and second tube 20.

The first tube 18 is held suspended in the second tube 20 by means of end plates 22 arranged at each of the first longitudinal ends 24, 26 and second longitudinal ends 28, 30 of the first tube 18 and second tube 20 respectively. For example, the first and second tubes may be welded onto the end plates 22.

The outside shape of the end plates 22 is adapted to the outside shape of the element. For example, they are hexagonal for the element 4.1, and trapezoidal for element 4.2.

Advantageously, the first tube 18 may comprise fins (not shown) on its outside surface improving heat transfer and cooling of the tube and its content.

Ports 32 are provided in the end plates 22 to enable air admission into the channel 19 and air exit from the channel 19, so as to cool the cases by scavenging of the first tube 20. Therefore the cooling means are arranged on the longitudinal faces of elements and do not hinder stacking of the elements.

Figure 3A:
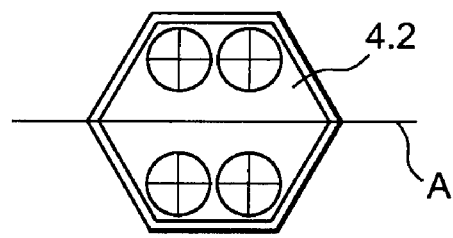
FIGS. 3A and 3B are diagrammatic views for the construction of elements according to this invention.
Figure 3B:
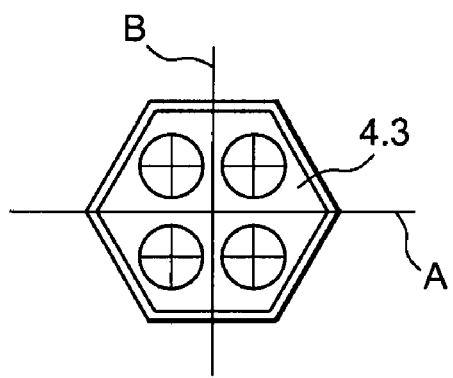

The ports 32 are shown in FIG. 1B, and are not shown in FIGS. 3A, 3B and 4.

In the example shown, artificial convection means (not shown), for example using fans, are used for airflow along the first tube 18. Implementation of artificial convection means provides a means of maintaining a high flow due to the large number of ports.

However, cooling by natural convection is sufficient, and air intake ports are formed in a lower part of one of the end plates 22 below the first tube 18 for this purpose, and the air evacuation ports are formed in an upper part of the other end plate above the first tube 18.

For example, the first tube 18 and the case 16 may be made of stainless steel, and the second tube 20 may for example be made of cast iron.

Figure 5:
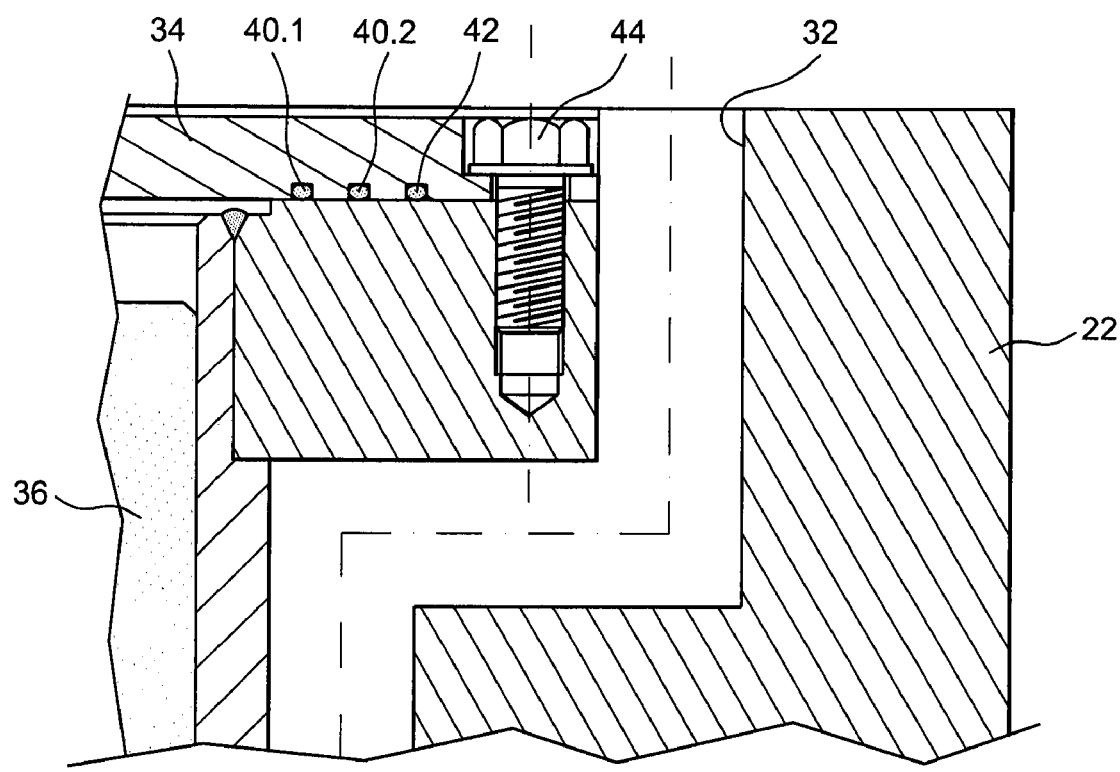
FIG. 5 is a detailed view of FIG. 2.

The first tube 18 is closed and sealed at its first end 24 and its second end 28 by two plugs 34. These plugs 34 are advantageously fixed in the end plates 22. FIG. 5 shows a detail of the cooperation between the plug 34 and the end plate 22.

For example, the plugs 34 may be provided with three gaskets, two metal gaskets 40.1, 40.2 of the Helicoflexe® type made of aluminium with a life of about 50 years, and an EPDM type synthetic peripheral gasket 42 like that shown in FIG. 5. The plugs 34 are held in place on the end plates, for example by means of screws 44 passing through the plug 34 and screwing into the end plate 22.

As we will see in the remainder of the description, the plug 34 is advantageously provided with a point for taking samples so as to check the seal of the cases and the sealing system of the plug 34.

The plugs 34 may also be welded directly after the tubes 18 have been filled. In this case, the seal of the weld may be inspected by means well known to those skilled in the art, such as injection of helium.

The end plates 22 will also be used to create a seal against radiation, participating in biological shielding of the front and back faces of the modules.

The element also comprises second plugs 36 inserted into the tube 18 forming biological shielding. The plugs 36 are formed from a mass.

Elements according to the invention comprise an external coating 21 made of concrete covering the second tube 20. This could be a standard concrete, that also acts as shielding against gamma radiation. The concrete can also advantageously stabilise the stack of modules in the case of an earthquake. Furthermore, advantageously it enables modules to resist the impact, for example, of a falling aircraft.

Advantageously, this invention provides good confinement security for the nuclear fuel.

Air used to cool the fuel is never in contact with the case, but only with the first tube 18.

Furthermore, confinement is achieved making use of:
the fuel duct,
the case weld,
the first tube 18 and its weld on the end plates 22,
the two metal gaskets 40.1, 40.2 and/or the weld (if any) of the plugs of the first tube 18,
gaskets of the seal inspection systems.

Sealing is achieved by the two metal gaskets 40.1, 40.2 in series followed by a third elastomer gasket 42, as described above.

The inspection is made as follows: helium is injected between the two metal gaskets 40.1, 40.2, the seal of the intermediate metal gasket 40.2 is then checked by connecting the helium detector between the second metal gasket 40.2 and the peripheral gasket 42.

Means are also provided for inspecting the different confinement barriers, for example by several sample taking points and a helium injection system.

The system for checking the seal of the case 16 is placed on the closing plug 34 of the first tube 18 and is used to check the seal of the cases using a helium detection system, the helium having been injected into the case at the time of its closure. Thus, detection of helium in the tube 18 will confirm that the case is no longer sealed.

It would be possible to place a sensor on the closing plug 34 of the first tube 18 that will detect loss of confinement of the case 16 by an increase in pressure in the first tube 18.

The sealing system of the closing plug 34 of the first tube 18 is checked by a first helium injection point placed between the two metal gaskets described above.

A second measurement point to which a helium detector is connected is placed between a metal gasket 40.2 and the synthetic peripheral gasket 42.

In addition to acting as a seal check, this gasket 42 protects the metal gaskets 40.1, 40.2 against humidity and corrosion.

It would be possible to pressurise the first tube 18 and the case 16 at different pressures, to check the sealing system of the closing plug 34 of the first tube 18 and the case 16. Thus, the seal of the case 16 or the first tube 18 can be checked indirectly by pressure sensors.

If there is a leak in the case 16, the pressure in the first tube 18 will increase, this pressure increase will be detected and analysed as a leak of the case 16.

The means of inspecting the tube 18 may consist of injection of a tracer gas into the free space between the tubes 18 and 20, and keeping this space under pressure.

We will now describe the loading of such an element.

The case is transported inside a transport container providing a second biological barrier and mechanical protection.

The empty case is placed in the container, the assembly is then immersed in a pool for loading the case with irradiated nuclear fuel.

When the case has been sealed and the container closed, the assembly is transported, for example lying flat horizontally on a trailer of a truck.

For placement in a storage element according to this invention, the container containing the case is advantageously arranged on a self-powered elevating platform that transports the transport packaging in the horizontal position and control of the vertical adjustment so that the case is brought facing an opening of the first tube 18.

The container is placed facing a storage element, a device is used to open the container and the storage element by isolating the external environment from radiation, inserted between the container and the storage element and connected to each in a sealed manner.

The bottom of the case and its cover are equipped with a gripping device, such that it can be removed from its two ends.

A means is provided for transferring the case from the container into the storage element.

When the transfer of the case is complete and the storage element and the container are closed, they will be separated.

Seal tests are made regularly throughout the storage period.

Therefore, this invention can be used to make a very safe storage device providing a modulable storage capacity at a cost price far below existing storage solutions. It is also simple to construct.

The invention claimed is:

1. Element for the storage of nuclear fuel comprising:
   at least one housing with a longitudinal axis intended to be horizontal to hold a case full of nuclear fuel,
   first and second longitudinal ends provided with passages to access the housing, said passages being closed and sealed by removable plugs,
   ventilation means comprising a cooling channel surrounding the housing and insulated from said housing in a sealed manner, and ventilation ports made in the first and second faces of the element and opening up in said cooling channel.

2. Element according to claim 1, with a cross-section formed by at least one portion of a regular hexagon.

3. Element according to claim 2, with a cross-section formed by a regular hexagon.

4. Element according to the previous claim comprising seven housings.

5. Element according to claim 2, with a cross-section formed by a regular trapezium obtained by cutting a regular hexagon with a straight line passing through two opposite apexes of said hexagon.

6. Element according to the previous claim, comprising two housings.

7. Element according to claim 2, with a cross-section formed by a rectangular trapezium obtained by cutting a regular hexagon with a mid-perpendicular passing through two opposite apexes of said hexagon and by a mid-perpendicular of one side of said hexagon, the straight line and the mid-perpendicular being perpendicular to each other.

8. Element according to the previous claim, comprising one housing.

9. Element according to claim 1, comprising a first tube delimiting the housing and closed in a sealed manner by the plugs, said first tube being designed to be in direct contact with at least one case, and surrounded by the cooling passage, and a second tube delimiting the cooling channel with the first tube, the second tube being surrounded by concrete.

10. Element according to the previous claim, wherein the first tube is held suspended in the second tube by means of end plates fixed to the longitudinal ends of the first and second tubes, and in which ventilation ports are formed, said end plates receiving the plugs and forming the longitudinal faces of the element.

11. Element according to the previous claim, wherein the plugs are welded on the end plates.

12. Element according to claim 10, wherein metal gaskets and a synthetic gasket are provided between the plugs and the end plates.

13. Element according to claim 9, wherein the first tube is made of stainless steel and the second tube is made of cast iron.

14. Element according to claim 1, comprising means of controlling the seal of the case and the housing.

15. Element according to the previous claim, wherein the control means comprise means of injecting helium and detecting helium.

16. Element according to claim 13, wherein the control means comprise sensors to measure the pressure in the housing.

17. Module for horizontal storage of nuclear fuel in cases, comprising a stack of elements, each element comprising at least:
    one housing with a longitudinal axis intended to be horizontal to hold a case full of nuclear fuel,
    first and second longitudinal ends provided with passages to access the housing, said passages being closed and sealed by movable plugs,
    ventilation means comprising a cooling channel surrounding the housing and insulated from said housing in a sealed manner, and ventilation ports made in the first and second faces of the element and opening up in said cooling channel.

18. Module according to the previous claim in combination with claim 2, wherein all elements have a cross-section obtained from a single regular hexagon so as to form a compact stack.

19. Module according to claim 17, with the shape of a rectangular parallelepiped.

20. Module according to claim 17, surrounded by a concrete screed on a lower face, an upper face and on the lateral faces, the longitudinal faces of the housings not being covered.

* * * * *